(12) United States Patent
Hatori et al.

(10) Patent No.: US 9,429,706 B2
(45) Date of Patent: Aug. 30, 2016

(54) OPTICAL WAVEGUIDE COUPLER AND METHOD FOR MANUFACTURING SAME

(71) Applicants: FUJITSU LIMITED, Kawasaki-shi, Kanagawa (JP); NEC Corporation, Minato-ku, Tokyo (JP)

(72) Inventors: Nobuaki Hatori, Tsukuba (JP); Masashige Ishizaka, Tokyo (JP); Takanori Shimizu, Tokyo (JP)

(73) Assignees: FUJITSU LIMITED, Kawasaki (JP); NEC CORPORATION, Tokyo (JP)

( * ) Notice: Subject to any disclaimer, the term of this patent is extended or adjusted under 35 U.S.C. 154(b) by 0 days.

(21) Appl. No.: 14/662,855

(22) Filed: Mar. 19, 2015

(65) Prior Publication Data

US 2015/0277044 A1    Oct. 1, 2015

(30) Foreign Application Priority Data

Mar. 28, 2014    (JP) ................................. 2014-068552

(51) Int. Cl.
G02B 6/122    (2006.01)
G02B 6/132    (2006.01)
G02B 6/42    (2006.01)
G02B 6/12    (2006.01)

(52) U.S. Cl.
CPC ............. *G02B 6/1228* (2013.01); *G02B 6/132* (2013.01); *G02B 6/42* (2013.01); *G02B 2006/12061* (2013.01); *G02B 2006/12102* (2013.01)

(58) Field of Classification Search
CPC .... G02B 6/1228; G02B 6/132; G02B 6/136; G02B 6/262
USPC ........................................................ 385/33, 43
See application file for complete search history.

(56) References Cited

U.S. PATENT DOCUMENTS 6,293,688 B1 *  9/2001  Deacon ................ G02B 6/1228
                                                       362/551
2002/0150320 A1  10/2002  Kato
2013/0170807 A1   7/2013  Hatori

FOREIGN PATENT DOCUMENTS

JP    2002-277657 A1    9/2002
JP    2004-151700 A1    5/2004
JP    2013-140205 A1    7/2013

* cited by examiner

*Primary Examiner* — Ryan Lepisto
(74) *Attorney, Agent, or Firm* — Kratz, Quintos & Hanson, LLP

(57) ABSTRACT

An optical waveguide coupler includes a substrate and an optical waveguide of a multi-layer structure of a first clad layer/a first waveguide layer/a second clad layer, at least, on the end surface side of an optical input and output provided on the substrate, characterized in that the first waveguide layer has such a distribution of the refractive index that the refractive index is the highest at the center of the first waveguide layer in the multi-layer structure in the stacking direction, and the first waveguide layer has such a protrusion in a convex form that the center portion having the highest refractive index protrudes in a cross section that is perpendicular to the end surface of the optical input and output and perpendicular to the main surface of the substrate.

12 Claims, 15 Drawing Sheets

Si COMPOSITION RATIO

REFRACTIVE INDEX

ETCHING RATE

BEAM SPOT

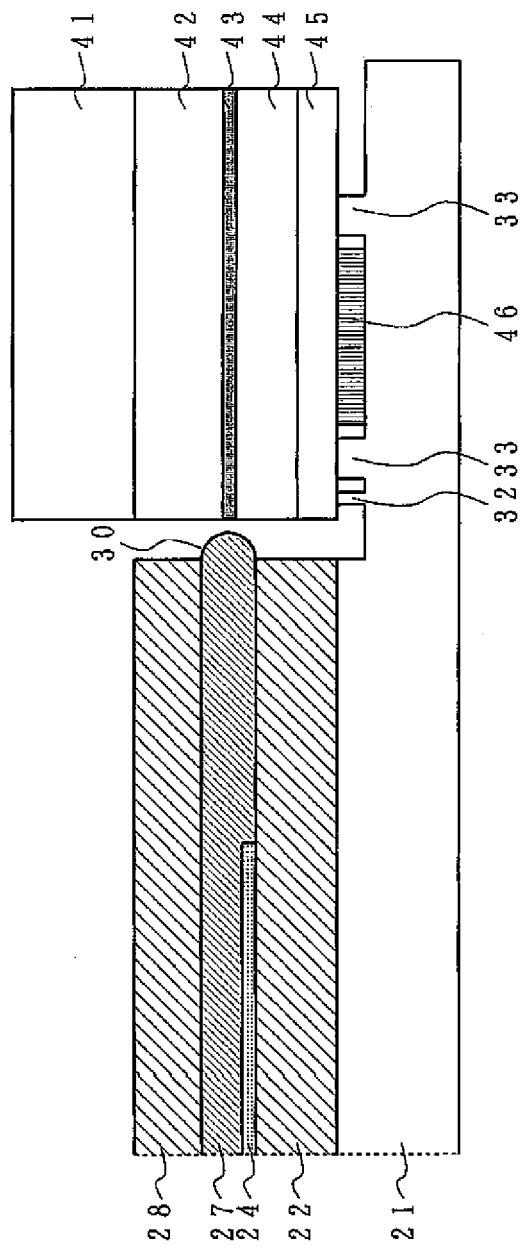

RELATED ART

BEAM SPREAD

MONITOR OUTPUT

RELATED ART

OPTICAL WAVEGUIDE COUPLER AND METHOD FOR MANUFACTURING SAME

CROSS-REFERENCE TO RELATED APPLICATION

This application is based upon and claims the benefit of priority of the prior Japanese Patent Application No. 2014-068552, filed on Mar. 28, 2014, the entire contents of which are incorporated herein by reference.

FIELD

The present invention relates to an optical waveguide coupler and method for manufacturing the same, and in particular, to an optical waveguide coupler used in the field of optical interconnection using optical wires on a Si substrate such as between boards, between chips and within a chip as well as in the field of optical fiber communications using optical fiber.

BACKGROUND

Development relating to silicon photonics wherein optical functional elements are formed on a silicon substrate has been progressing due to reasons related to the superiority of processing technology, to industrial ripple effects, and to miniaturization of elements. Silicon itself does not provide a light emitting mechanism and, therefore, it is necessary to input light from the outside.

One of the techniques for this is a hybrid integration system wherein a spot size converter is provided on the silicon waveguide side, a semiconductor laser with a spot size converter is prepared as an external light source and the end surfaces of the two are placed in opposition to each other by adjusting the respective spot sizes so as to be the same size for optical coupling.

In this case it has been proposed that the silicon waveguide be made to be gradually narrower so as to increase the effusion of light and, thus, to increase the beam spot size (see Patent Document 1). A spot size converter that is tolerant to variations in manufacture has also been proposed (see Patent Document 2).

Furthermore, it has been proposed to make the end surface of the waveguide into a semi-cylindrical lens form in order to increase the efficiency in coupling with the semiconductor laser (see Patent Document 3).

FIGS. 11A to 11C are a diagram and graphs illustrating the structure in the vicinity of the end surface of a conventional optical waveguide coupler through which light enters and exits. FIG. 11A is a schematic perspective diagram, FIG. 11B illustrates a distribution of the Si composition ratio in the stacking direction, and FIG. 11C illustrates a distribution of the refractive index in the stacking direction. As illustrated in FIG. 11B, a core layer 62 is made of $SiO_x$ (x<2) where the composition ratio x is constant. Accordingly, as illustrated in FIG. 11C, the refractive index distributes in a step function manner for a lower clad layer 61 and an upper clad layer 63 made of $SiO_2$. When a laser beam from a semiconductor laser 64 is incident on this core layer 62, the laser beam transmits through the core layer 62.

FIGS. 12A and 12B are graphs illustrating the coupling efficiency of a conventional optical waveguide coupler. FIG. 12A is a graph illustrating the results of a simulation of a distribution of light intensity, where the right half is a simplified copy of the left half. FIG. 12B is a graph illustrating the intensity of light in the z direction, that is to say, in the direction in which the light propagates. It can be seen from FIG. 12A that the beam spreads. As illustrated in FIG. 12B, significant attenuation is observed in the intensity of the light in the direction in which the light propagates. Here, the arrow in FIG. 12B indicates the position from which light enters. This is the result of two-dimensional BPM calculation relative to the coupling with a semiconductor laser having a beam spot size in an elliptical form that is wide in the horizontal direction.

PRIOR ART DOCUMENTS

Patent Documents

Patent Document 1: Japanese Laid-open Patent Publication 2004-151700
Patent Document 2: Japanese Laid-open Patent Publication 2013-140205
Patent Document 3: Japanese Laid-open Patent Publication 2002-277657

SUMMARY

However, it is assumed in the above described spot size converters in Patent Document 1 and in Patent Document 2 that the beam spots are approximately circular. Accordingly, mode mismatching is great when coupling with a semiconductor laser in the case wherein the beam spot of the semiconductor laser is out from circular, for example when the beam spot is in an elliptical form that is narrow in the vertical direction and wide in the horizontal direction and, thus, such a problem arises that coupling loss is great.

As an example of such a semiconductor laser having a beam spot in an elliptical form that is narrow in the vertical direction, a quantum dot (QD) laser can be cited. This QD laser has excellent temperature properties and, thus, is appropriate for use for higher temperature operation. However, a multi-layer structure for quantum dots is indispensable in order to increase the optical gain and, as a result, confinement of light in the vertical direction is strengthened and, thus, the beam spot becomes of an elliptical form that is narrow in the vertical direction. Therefore, it is desirable to provide a spot size converter that makes coupling with a semiconductor laser having a flat beam spot, such as a QD laser, possible at a low loss.

Another problem arises such that the above described semi-cylindrical lens structure illustrated in Patent Document 3 is not appropriate for beam spots in elliptical form that are narrow in the vertical direction though the structure can be used for beam spots in elliptical form that are narrow in the horizontal direction.

According to one disclosed aspect, an optical waveguide coupler is provided with: a substrate; and an optical waveguide of a multi-layer structure of a first clad layer/a first waveguide layer/a second clad layer, at least, on the end surface side of an optical input and output provided on the substrate, and is characterized in that the first waveguide layer has such a distribution of the refractive index that the refractive index is the highest at the center of the first waveguide layer in the multi-layer structure in the stacking direction, and the first waveguide layer has such a protrusion that the center portion having the highest refractive index protrudes in a cross section that is perpendicular to the end surface through which light enters and exits and perpendicular to the main surface of the substrate.

According to another disclosed aspect, a manufacturing method for an optical waveguide coupler is characterized by being provided with: forming a second waveguide layer on a substrate with a first clad layer in between; forming a first waveguide layer having such a distribution of the refractive index that the refractive index is the highest at the center in the stacking direction so as to cover the second waveguide layer and the first clad layer that is exposed from the second waveguide layer; forming a second clad layer on the first waveguide layer; forming an end surface from the second clad layer through the first clad layer are exposed by etching at least the layers from the second clad layer through the first clad layer; and forming a protrusion of the first waveguide layer in an convex form so that the first waveguide layer protrudes from the first clad layer and the second clad layer through etching under such conditions that the etching rates of the first clad layer and the second clad layer are faster than the etching rate of the first waveguide layer.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 7 is a diagram illustrating the optical interconnection system according to the second embodiment of the present invention;

DESCRIPTION OF EMBODIMENTS

Figure 1A:
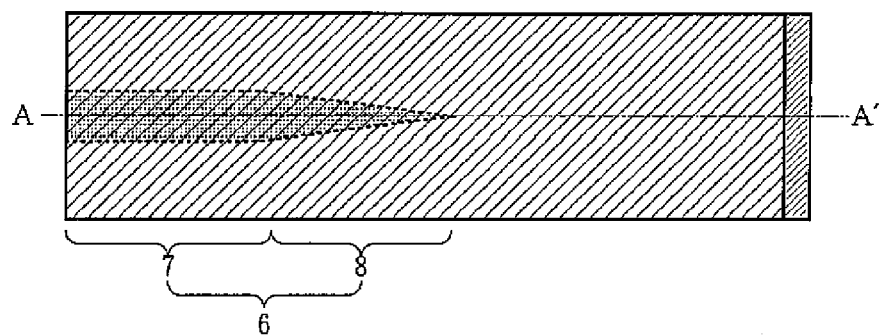
FIGS. 1A and 1B are diagrams illustrating the structure of the optical waveguide coupler according to embodiments of the present invention.
Figure 1B:
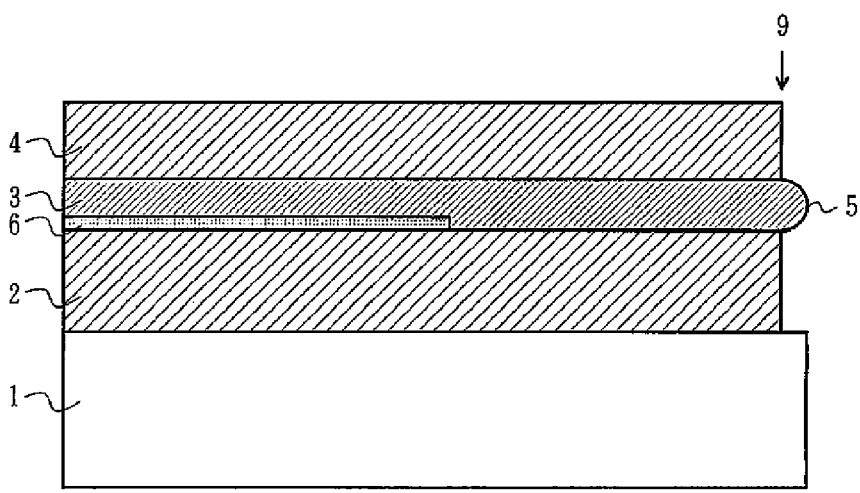

In reference to FIGS. 1A to 4, the optical waveguide coupler according to embodiments of the present invention is described below. FIGS. 1A and 1B are diagrams illustrating the structure of the optical waveguide coupler according to embodiments of the present invention. FIG. 1A is a perspective top diagram and FIG. 1B is a cross sectional diagram along a single dotted chain line A-A' in FIG. 1A. The optical waveguide coupler according to embodiments of the present invention has, on a substrate 1, an optical waveguide with a multi-layer structure of a first clad layer 2/a first waveguide layer 3/a second clad layer 4 at least on the side of an end surface 9 of an optical input and output. The first waveguide layer 3 has a distribution of the refractive index such that the center of the first waveguide layer 3 has the highest refractive index in the stacking direction in the multi-layer structure. In addition, the end surface 9 through which light enters and exits has a protrusion 5 that protrudes from the center portion having the highest refractive index in the cross section that is perpendicular to the end surface 9 through which light enters and exits and perpendicular to the main surface of the substrate 1. Furthermore, the protrusion 5 may be in a protruding form also in the cross section parallel to the substrate 1, that is to say, the protrusion 5 may be in a hemispherical lens form.

Typically, the first clad layer 2 and the second clad layer 4 are made of $SiO_2$, and the first waveguide layer 3 is made of $SiO_x$ wherein the composition ratio x is at the lowest in the center. In addition, a second waveguide layer 6 of which the refractive index is higher than that of the first waveguide layer 3 is provided between the first clad layer 2 and the first waveguide layer 3 in a position away from the end surface 9 through which light enters and exits.

It is desirable for the second waveguide layer 6 to be provided with a tapered region 8 where the width of the waveguide is narrow on the side of the end surface 9 through which light enters and exits, and the width of the waveguide is wider as the position is further away from the end surface 9 through which light enters and exits in order to increase the efficiency of optical coupling. This tapered region 8 is connected to a region 7 having a constant width, which is an optical wire layer.

In the case of application to Si photonics, the substrate 1 is a monocrystalline Si substrate in an SOI substrate wherein an monocrystalline Si layer is provided on the monocrystalline Si substrate with a buried insulating film in between, and the first clad layer 2 is the buried insulting film in the SOI substrate. In addition, the second waveguide layer 6 is a waveguide layer formed by processing the monocrystalline Si layer in the SOI substrate.

In this case, pedestals are formed by processing a portion of the monocrystalline Si substrate in the vicinity of the end surface 9 of an optical input and output in the SOI substrate, and an optically functional element is mounted on these pedestals to place the protrusion 5 in the first waveguide layer 3 and the surface of the optical input and output in opposition to each other and, thus, and optical interconnection system is formed. As an example of the optically functional element in this case, a semiconductor laser, a semiconductor optical amplifier, a semiconductor light receiving element and a semiconductor modulating element can be cited.

In order to form such a structure, a second waveguide layer 6 is formed on a substrate 1 with a first clad layer 2 in between and, then, a first waveguide layer 3, having such a distribution of the refractive index that the refractive index is highest at the center in the stacking direction, is formed on the entire surface, on top of which a second clad layer 4 is formed. Subsequently, at least, layers from the second clad layer 4 to the first clad layer 2 are etched so as to provide an end surface exposed from the second clad layer 4 to the first clad layer 2.

Next, etching is carried out under such conditions that the etching rate of the first clad layer 2 and second clad layer 4 is faster than that of the first waveguide layer 3 so that a protrusion 5 of the first waveguide layer 3 that protrudes from the first clad layer 2 and the second clad layer 4 is formed in a convex form. Here, the protrusion 5 is in a semi-cylindrical form in the case wherein the end surface is in flush, and is in a hemispherical form in the case wherein a portion of the end surface is in a semi-cylindrical form of which the center axis is in the stacking direction.

Figure 2A:
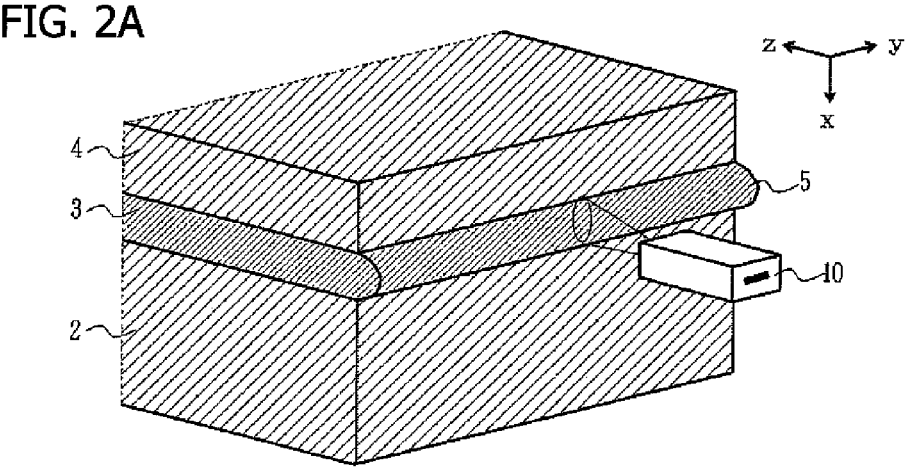
FIGS. 2A to 2D are a diagram and graphs illustrating the end surface, and vicinity of the optical input and output of the optical waveguide coupler according to embodiments of the present invention.
Figure 2B:
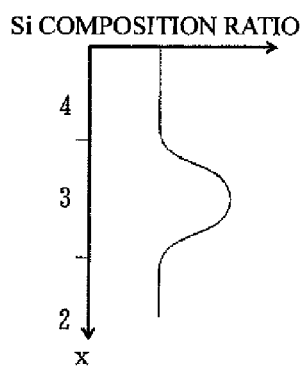
Figure 2C:
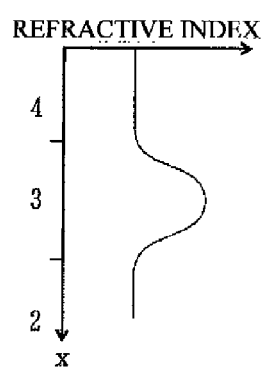
Figure 2D:
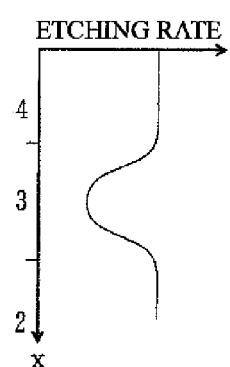

FIGS. 2A to 2D are a diagram and graphs illustrating the end surface, and vicinity, through which light enters and exits of the optical waveguide coupler according to embodiments of the present invention. FIG. 2A is a schematic perspective diagram, FIG. 2B illustrates a distribution of the Si composition ratio in the stacking direction, FIG. 2C illustrates a distribution of the refractive index in the stacking direction, and FIG. 2D illustrates a distribution of the etching rate in the stacking direction.

As illustrated in FIG. 2B, the first waveguide layer 3 is made of $SiO_x$ wherein the O composition ratio x is the lowest at the center and, therefore, has a lens effect by itself, but also has the distribution of etching rate illustrated in FIG. 2D and, thus, the protrusion 5 is provided as illustrated in FIG. 2A, that is to say, the first waveguide layer 3 is in a lens form. Accordingly, the distribution of the composition ratio and the form effect is combined to provide the distribution of refractive index illustrated in FIG. 2C. Thus, the first waveguide layer 3 has the characteristics of a convex lens with a distribution of the refractive index in the stacking direction perpendicular to the substrate 1, in the vicinity of the end surface 9 of an optical input and output and, therefore, optical coupling with a semiconductor laser 10 that is flat in the horizontal direction is made possible with a low loss.

Figure 3A:
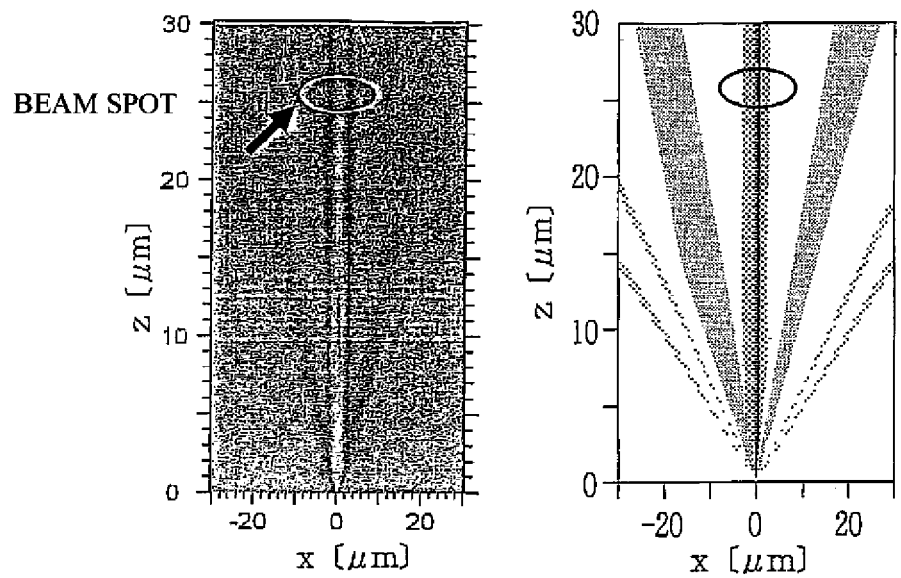
FIGS. 3A and 3B are graphs illustrating the coupling efficiency of the optical waveguide coupler according to embodiments of the present invention.
Figure 3B:
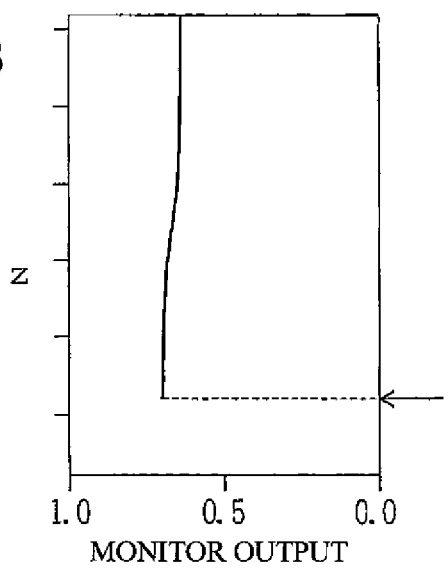

FIGS. 3A and 3B are graphs illustrating the coupling efficiency of the optical waveguide coupler according to embodiments of the present invention. FIG. 3A is a graph illustrating the distribution of the light intensity resulting from a simulation, wherein the right half is a simplified copy of the left half. In addition, FIG. 3B is a graph illustrating the intensity of light in the z direction, that is to say, in the direction in which light propagates. Here, a two-dimensional BPM calculation is carried out in terms of the coupling with a semiconductor laser of which the beam spot is in an elliptical form that is wide in the horizontal direction.

Figure 11A:
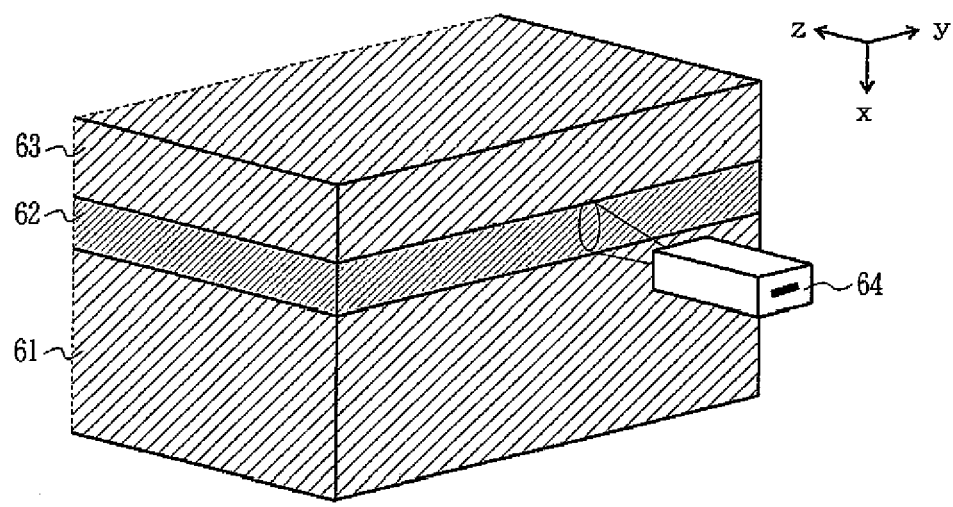
FIGS. 11A to 11C are a diagram and graphs illustrating the end surface through which light enters and exits and the vicinity thereof in a conventional waveguide coupler.
Figure 11B:
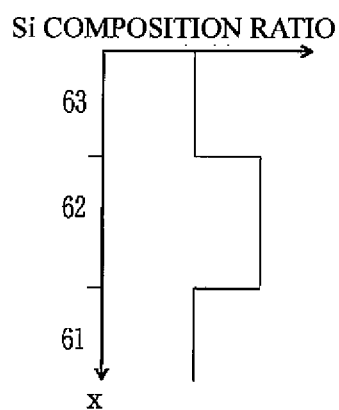
Figure 11C:
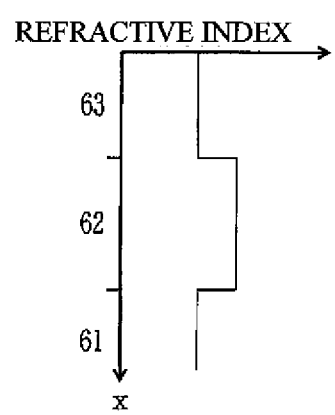
Figure 12A:
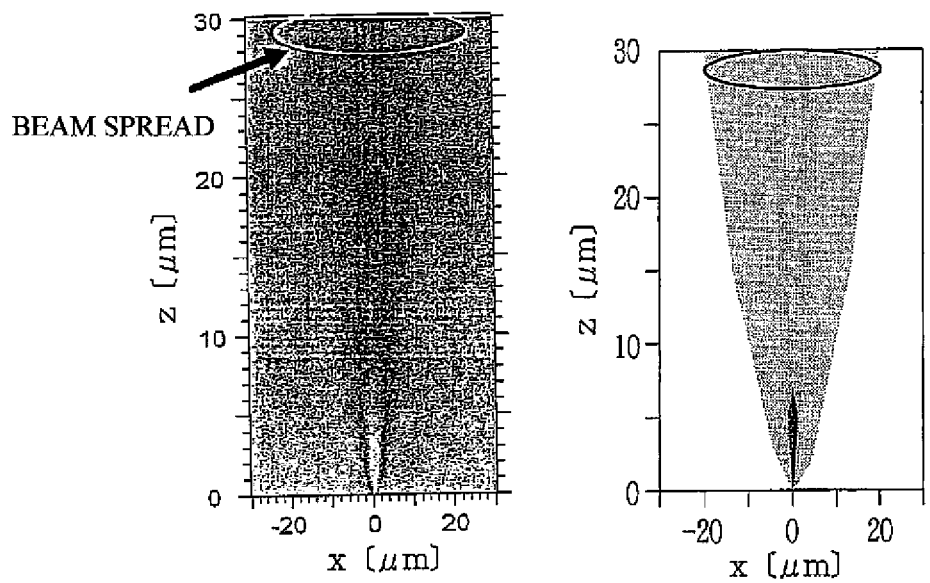
FIGS. 12A and 12B are graphs illustrating the coupling efficiency of the conventional optical waveguide coupler.
Figure 12B:
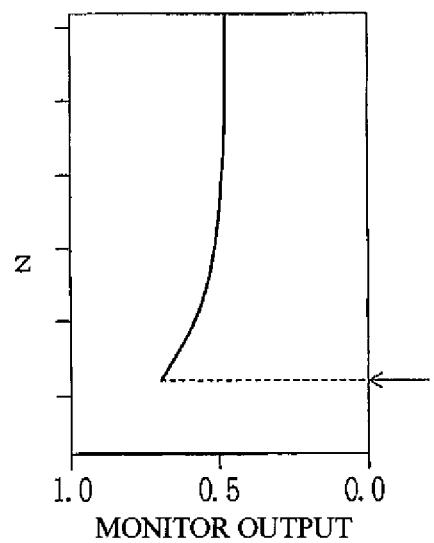

The light output of a semiconductor laser having a beam spot in an elliptical form that is narrow in the vertical direction is such that the beam spreads in the vertical direction due to the diffraction effects of light as the position is further away from the end surface of the semiconductor laser. The spread beam outputted from the semiconductor laser enters into the first waveguide layer 3 through the end surface. The end surface of the first waveguide layer 3 is in a convex lens form and, therefore, the beam propagates through the first waveguide layer 3 without spreading due to focusing effects of a lens. It can be seen from FIG. 3A that the beam is condensed as compared to the distribution of light intensity illustrated in FIG. 11A. It can also be seen that the intensity in the direction in which light propagates illustrated in FIG. 3B is little attenuated. Here, the arrow in FIG. 3B indicates the incident position.

Figure 4:
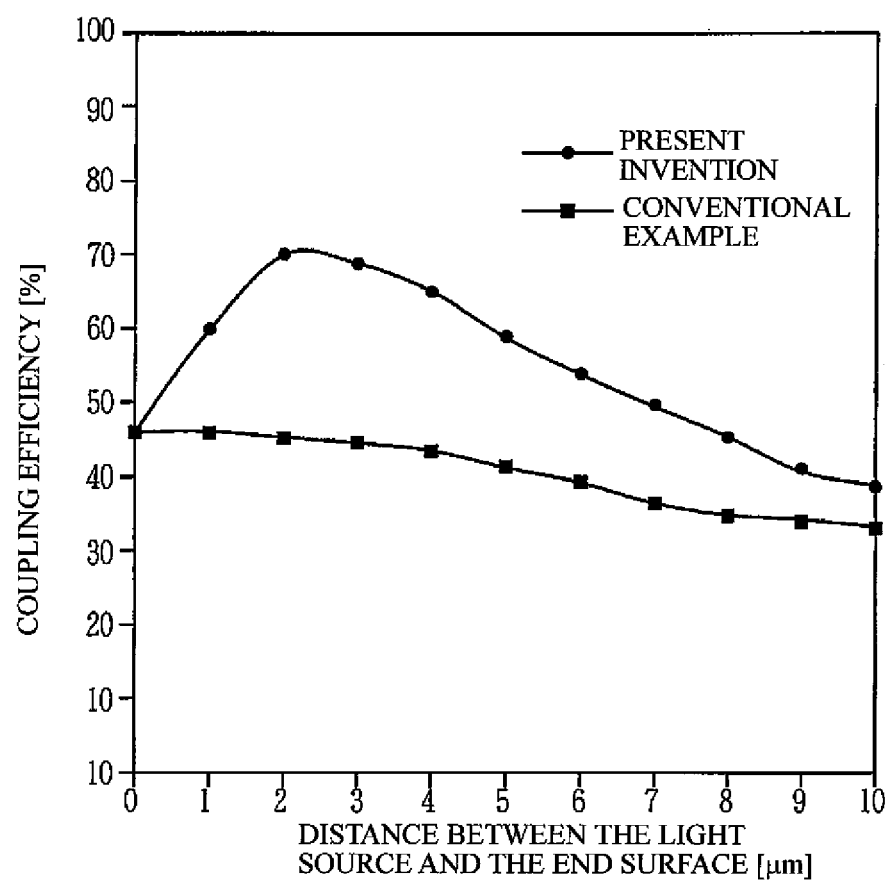
FIG. 4 is a graph illustrating the dependency of the coupling efficiency on a gap in the optical waveguide coupler according to embodiments of the present invention.

FIG. 4 is a graph illustrating the dependency of the coupling efficiency on a gap in the optical waveguide coupler according to embodiments of the present invention. Here, the coupling efficiency of a conventional optical waveguide coupler is illustrated together for reference. In the conventional optical waveguide coupler, the coupling efficiency gradually decreases as the distance between the light source and the end surface becomes greater. Meanwhile, the optical waveguide coupler according to embodiments of the present invention has a maximum value of approximately 70% in a position away from the end surface and has a coupling efficiency that is approximately 1.5 times greater than that of the conventional optical waveguide coupler.

According to the disclosed optical waveguide coupler and manufacturing method for the same, it is possible to implement an optical waveguide coupler with a spot size converter having a simple structure that can lower the loss in the coupling with a laser light source, which is wide in the horizontal direction.

First Embodiment

Figure 5A:
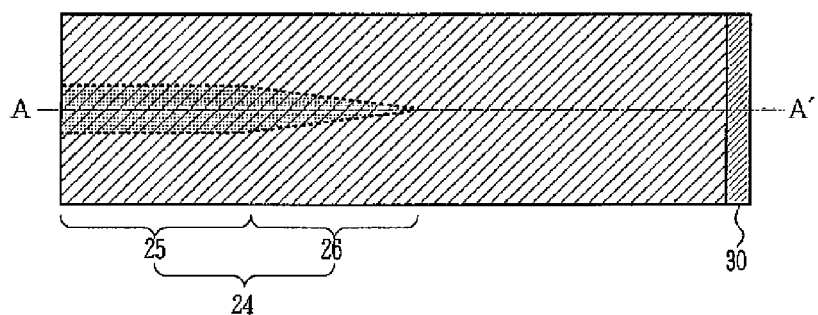
FIGS. 5A and 5B are diagrams illustrating the structure of the optical waveguide coupler according to the first embodiment of the present invention.
Figure 5B:
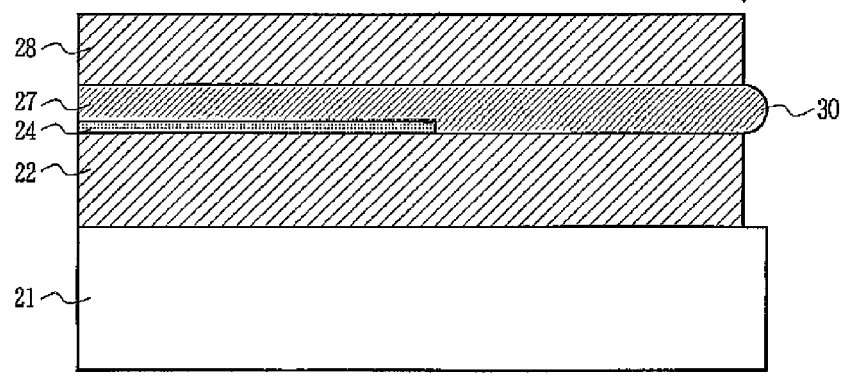

Next, in reference to FIGS. 5A to 6F, the optical waveguide coupler according to the first embodiment of the present invention is described. FIGS. 5A and 5B are diagrams illustrating the structure of the optical waveguide coupler according to the first embodiment of the present invention. FIG. 5A is a perspective top diagram and FIG. 5B is a cross sectional diagram along a single dotted chain line A-A' in FIG. 5A. As illustrated in the figures, a monocrystalline Si layer that has been provided on a monocrystalline Si substrate 21 with a $SiO_2$ BOX layer 22 in between in an SOI substrate is processed so as to provide a Si waveguide layer 24 made up of a portion 25 having a constant width and of a tapered portion 26. A $SiO_x$ waveguide layer 27 is provided so as to cover the Si waveguide layer 24 and the exposed surface of the $SiO_2$ BOX layer 22, and a $SiO_2$ upper clad layer 28 is provided on top of the $SiO_x$ waveguide layer 27.

At this time, the $SiO_x$ waveguide layer 27 has such a distribution of the composition that the O composition ratio x is the lowest at the center in the stacking direction and a semi-cylindrical lens portion 30 is provided so as to protrude from an end surface 31 in the horizontal direction relative to the main surface of the monocrystalline Si substrate 21. Since the O composition ratio x is the lowest at the center of the $SiO_x$ waveguide layer 27 in the stacking direction, the refractive index is the highest at the center, which combine with the shape effect so as to achieve the function of a semi-cylindrical lens.

Figure 6A:
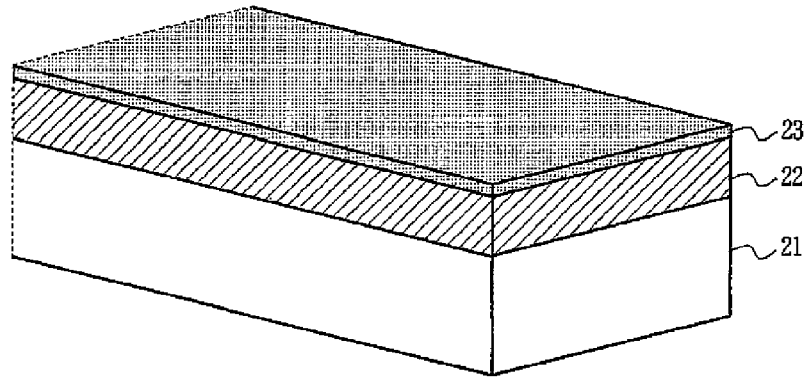
FIGS. 6A and 6B are diagrams illustrating the steps of manufacture of the optical waveguide coupler according to the first embodiment of the present invention.
Figure 6B:
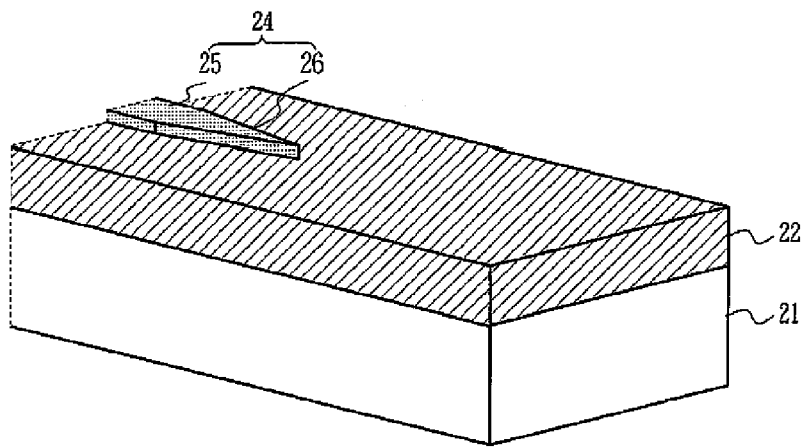

Next, in reference to FIGS. 6A to 6F, the steps of manufacturing the optical waveguide coupler according to the first embodiment of the present invention is described. First, as illustrated in FIG. 6A, an SOI substrate wherein a monocrystalline Si layer 23 having a thickness of 220 nm is provided on a monocrystalline Si substrate 21 with a SiO$_2$BOX layer 22 having a thickness of 3 μm in between is prepared. Next, as illustrated in FIG. 6B, the monocrystalline Si layer 23 is etched so as to form a Si waveguide layer 24 made up of a portion 25 having a constant width of 450 nm and of a tapered portion 26 having a length of 50 μm.

Figure 6C:
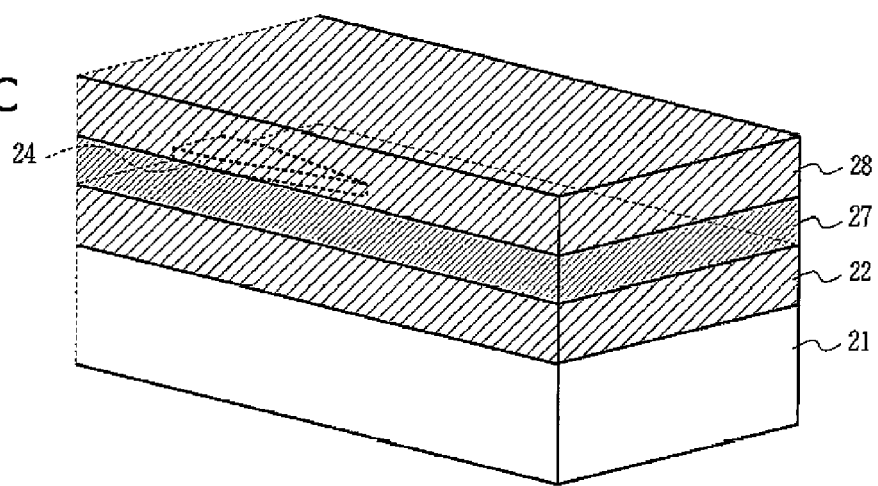
FIGS. 6C and 6D are diagrams illustrating the steps of manufacture of the optical waveguide coupler according to the first embodiment of the present invention after the step in FIG. 6B.

Next, as illustrated in FIG. 6C, a SiO$_x$ waveguide layer 27 having a thickness of 6 μm and a SiO$_2$ upper clad layer 28 having a thickness of 2 μm are sequentially formed on the entire surface by using a CVD method. At this time, the SiO$_x$ waveguide layer 27 is formed while the O composition ratio x is reduced. After x has been reduced to 1.93, which is the minimum value, the film is continuously formed while x is increased. When x=1.93, the refractive index is 1.52, which is higher than the refractive index of SiO$_2$ of 1.46.

Figure 6D:
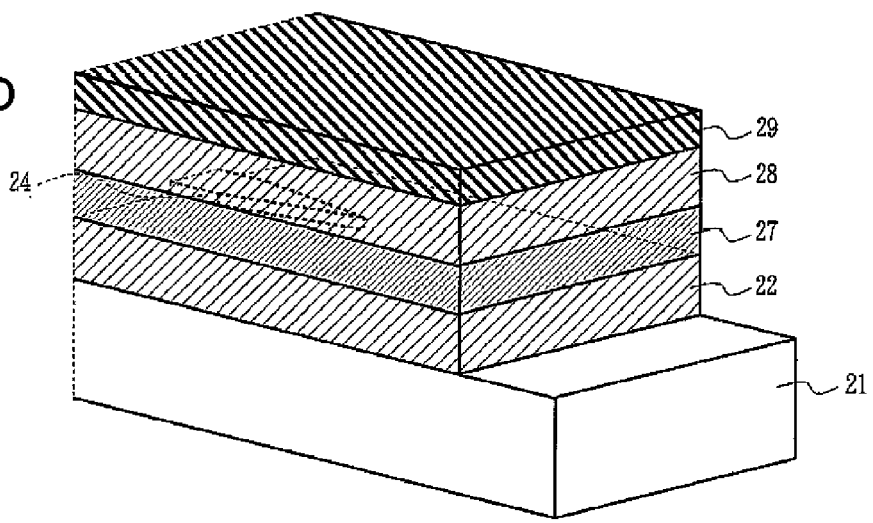

Next, as illustrated in FIG. 6D, a patterned resist 29 is used as a mask for dry etching so that the exposed portion of the layers from the SiO$_2$ upper clad layer 28 to the SiO$_2$BOX layer 22 are etched so as to provide an end surface in flush.

Figure 6E:
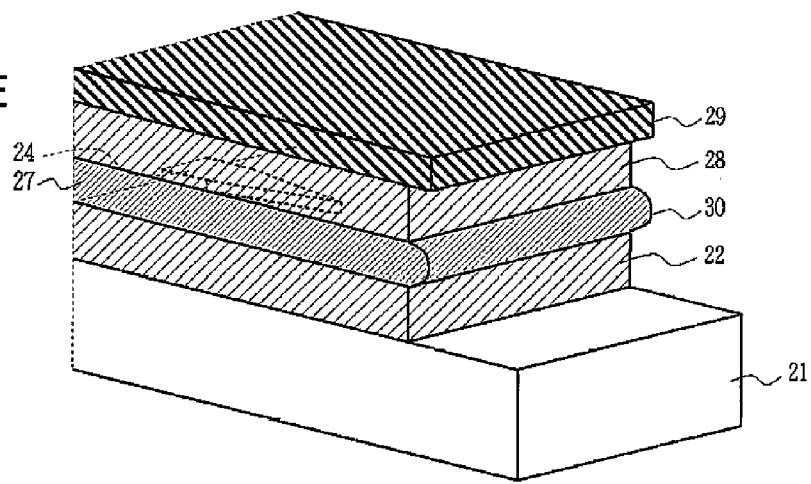
FIGS. 6E and 6F are diagrams illustrating the steps of manufacture of the optical waveguide coupler according to the first embodiment of the present invention after the step in FIG. 6D.

Next, as illustrated in FIG. 6E, the patterned resist 29 is used as a mask as it is for wet etching using HF so that the end surface of the layers from the SiO$_2$ upper clad layer 28 to the SiO$_2$BOX layer 22 are etched from the side. At this time the etching rate of SiO$_2$ by HF is greater than that of SiO$_x$ and, therefore, the etched amounts of the SiO$_2$ upper clad layer 28 and SiO$_2$BOX layer 22 are greater. In the SiO$_x$ waveguide layer 27, the etched amount is the smallest in the center portion where the O composition ratio x is the lowest and, therefore, a semi-cylindrical lens portion 30 is formed on the end surface of the SiO$_x$ waveguide layer 27.

Figure 6F:
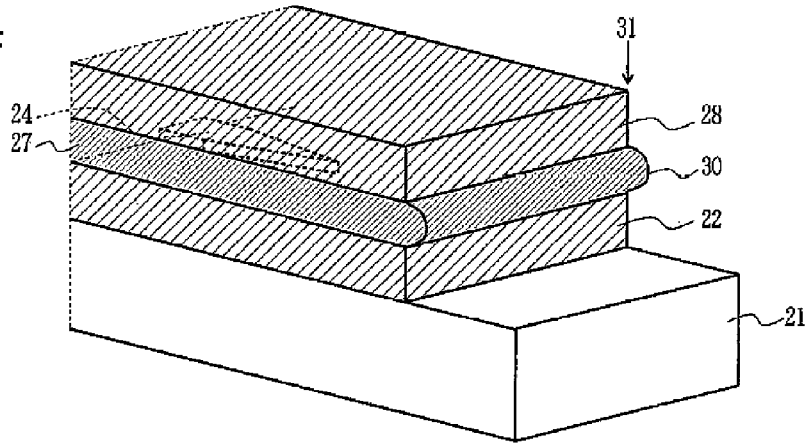

Next, as illustrated in FIG. 6F, the patterned resist 29 is removed through O$_2$ ashing and, thus, the basic structure of the optical waveguide coupler according to the first embodiment of the present invention is complete. Here, the semi-cylindrical lens portion 30 is exposed from the end surface 31.

When the optical waveguide coupler according to the first embodiment of the present invention is coupled with a semiconductor laser having a lasing wavelength of 1.55 μm and having a beam spot in an elliptical form that is narrow in the vertical direction wherein the size of the beam spot is 1 μm in the vertical direction and 4 μm in the horizontal direction, the coupling efficiency can be improved.

Second Embodiment

Next, in reference to FIG. 7, the optical interconnection system according to the second embodiment of the present invention is described. Here, an optical interconnection system wherein the optical waveguide coupler according to the first embodiment and a semiconductor laser are coupled is described. FIG. 7 is a diagram illustrating the optical interconnection system according to the second embodiment of the present invention, wherein the monocrystalline Si substrate on which an optical waveguide coupler is provided is processed so as to form an alignment mark 32 and pedestals 33, and a solder bump 46 is provided between the pedestals 33.

Meanwhile, to match to the wavelength that propagates through the optical waveguide coupler, the semiconductor laser that oscillates at a wavelength of 1.55 μm band is mounted on the monocrystalline Si substrate 21 using the solder bump 46. In this case, the semiconductor laser has an active layer 43 wherein InAs quantum dots are formed on a semiconductor substrate 41 made of n type GaAs with a lower clad layer 42 made of n type GaAs in between. Here, an upper clad layer 44 made of p type AlGaAs and a contact layer 45 made of p type GaAs are provided on the active layer 43.

In the second embodiment of the present invention, the alignment mark 32 can be used for precise positioning and, therefore, the light outputted from the semiconductor laser transmits through the SiO$_x$ waveguide layer 27 via the semi-cylindrical lens portion 30, which acts as an end surface lens, and is transmitted to an optical receiver via an optical fiber from the Si waveguide layer 24. Though in the second embodiment a semiconductor laser is mounted, an optically functional element other than the semiconductor laser, for example, a semiconductor optical amplifier, a semiconductor light receiving element or an electro-absorption modulator may be mounted.

Third Embodiment

Figure 8A:
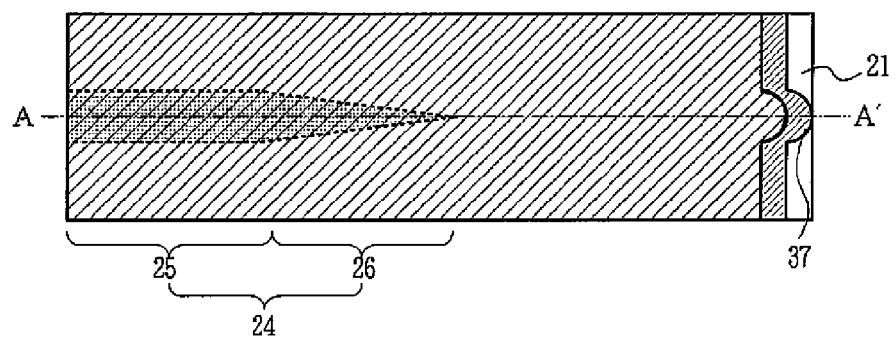
FIGS. 8A and 8B are diagrams illustrating the structure of the optical waveguide coupler according to the third embodiment of the present invention.
Figure 8B:
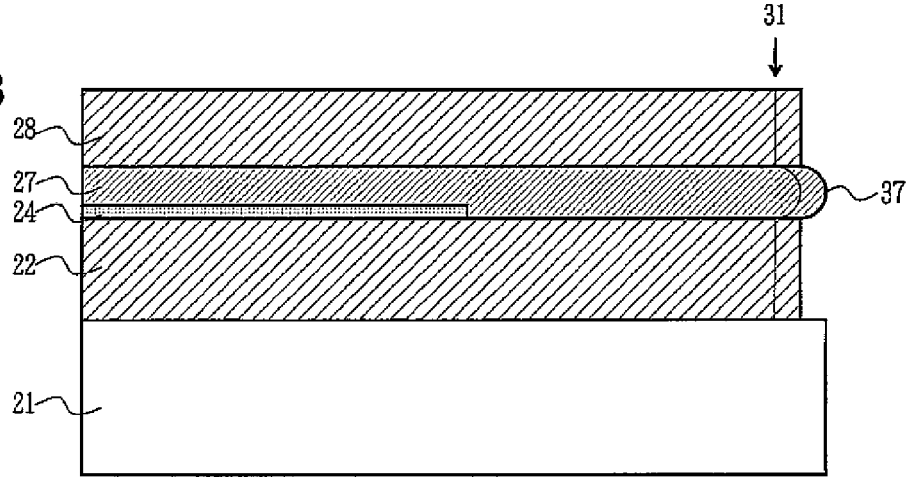

Next, in reference to FIGS. 8A to 9D, the optical waveguide coupler according to the third embodiment of the present invention is described. FIGS. 8A and 8B are diagrams illustrating the structure of the optical waveguide coupler according to the third embodiment of the present invention. FIG. 8A is a perspective top diagram, and FIG. 8B is a cross sectional diagram along the single dotted chain line A-A' in FIG. 8A. As illustrated in the figures, a monocrystalline Si layer provided on a monocrystalline Si substrate 21 with a SiO$_2$BOX layer 22 in between is process so as to provide a Si waveguide layer 24 made up of a portion 25 having a constant width and of a tapered portion 26 in the same manner as in the first embodiment. The SiO$_x$ waveguide layer 27 is provided so as to cover the Si waveguide layer 24 and the exposed surface of the SiO$_2$BOX layer 22, and a SiO$_2$ upper clad layer 28 is provided on top of the SiO$_x$ waveguide layer 27.

At this time as well, the SiO$_x$ waveguide layer 27 has such a distribution of composition that the O composition ratio x is the lowest at the center in the stacking direction, and a semi-cylindrical lens portion 30 is provided so as to protrude from the end surface 31 in the horizontal direction relative to the main surface of the monocrystalline Si substrate 21. Here, a protrusion in a semi-circular form is provided to the patterned resist that becomes an etching mask at the process of the lens and, as a result, a lens portion 37 in a hemispherical form protrudes from the end surface 31.

Figure 9A:
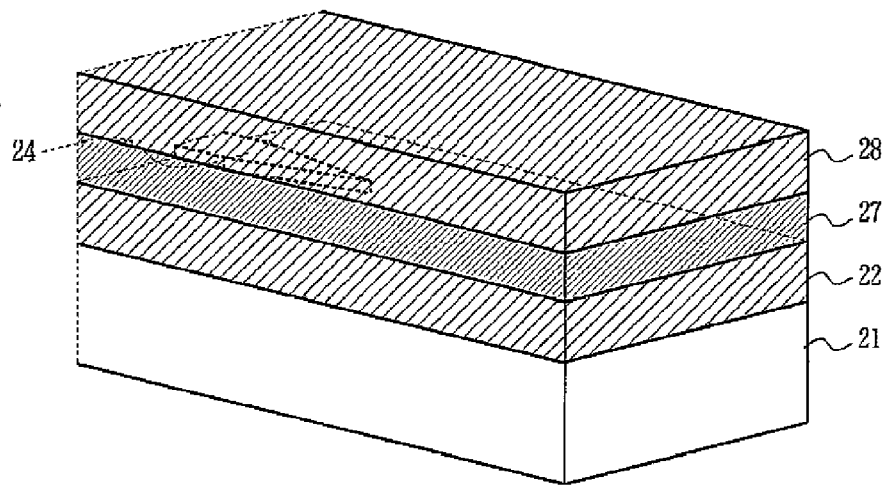
FIGS. 9A and 9B are diagrams illustrating the steps of manufacture of the optical waveguide coupler according to the third embodiment of the present invention.

Next, in reference to FIGS. 9A to 9D, the steps of manufacturing the optical waveguide coupler according to the third embodiment of the present invention is described. First, as illustrated in FIG. 9A, an SOI substrate wherein a monocrystalline Si layer having a thickness of 220 nm is provided on a monocrystalline Si substrate 21 with a SiO$_2$BOX layer 22 having a thickness of 3 μm in between is prepared in the same manner as in the first embodiment. Next, the monocrystalline Si layer is etched so as to form a Si waveguide layer 24 made up of a portion 25 having a constant width of 450 nm and of a tapered portion 26 having a length of 50 μm.

Next, a SiO$_x$ waveguide layer 27 having a thickness of 6 μm and a SiO$_2$ upper clad layer 28 having a thickness of 2 μm are sequentially formed on the entire surface by using a CVD method. At this time, the SiO$_x$ waveguide layer 27 is formed while the O composition ratio x is reduced. After x has been reduced to 1.93, which is the minimum value, the film is continuously formed while x is increased. When x=1.93, the refractive index is 1.52, which is higher than the refractive index of SiO$_2$ of 1.46.

Figure 9B:
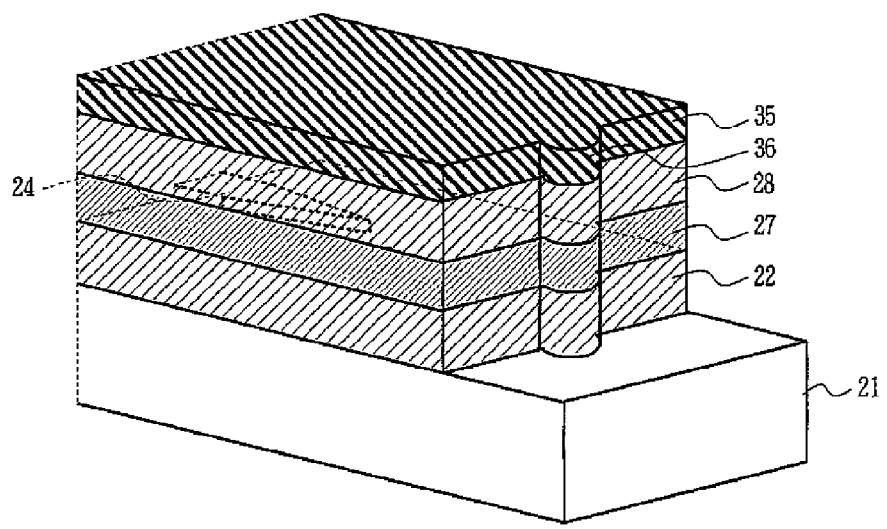

Next, as illustrated in FIG. 9B, a patterned resist 35 having a protrusion 36 in a semi-circular form with a radius of 3 μm is provided. The patterned resist 35 is used as a mask for dry etching so that the exposed portions of the layers from the SiO₂ upper clad layer 28 to the SiO₂BOX layer 22 are etched so as to form an end surface having a protrusion in a semi-cylindrical form.

Figure 9C:
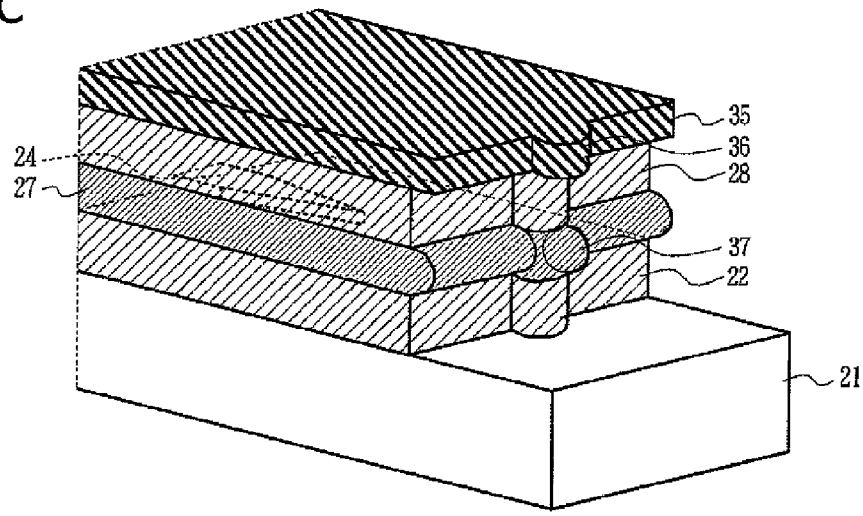
FIGS. 9C and 9D are diagrams illustrating the steps of manufacture of the optical waveguide coupler according to the third embodiment of the present invention after the step in FIG. 9B.

Next, as illustrated in FIG. 9C, the patterned resist 35 is used as a mask as it is for wet etching using HF so that the end surface of the layers from the SiO₂ upper clad layer 28 to the SiO₂BOX layer 22 is etched from the side. At this time the etching rate of SiO₂ by HF is greater than that of SiO$_x$ and, therefore, the etched amounts of the SiO₂ upper clad layer 28 and SiO₂BOX layer 22 are greater. In the SiO$_x$ waveguide layer 27, the etched amount is the smallest in the center portion where the O composition ratio x is the lowest and, therefore, a lens portion 37 in a hemispherical form is formed in the protrusion in a semi-cylindrical form, and on the two sides thereof semi-cylindrical lens are formed on the end surface of the SiO$_x$ waveguide layer 27.

Figure 9D:
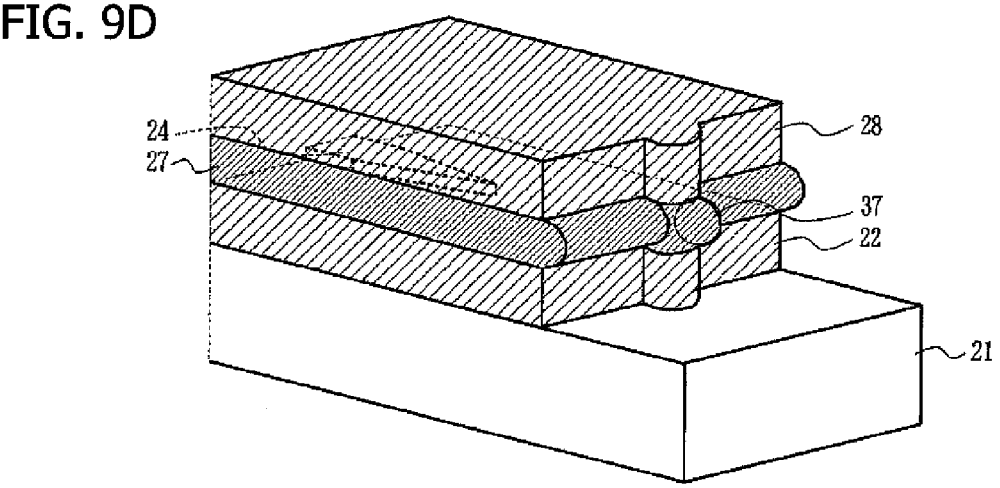

Next, as illustrated in FIG. 9D, the patterned resist 35 is removed through O₂ ashing and, thus, the basis structure of the optical waveguide coupler according to the third embodiment of the present invention is complete. Here, a lens portion 37 in a hemispherical form is exposed from the end surface.

In the optical waveguide coupler according to the third embodiment of the present invention, a lens portion 37 in a hemispherical form is provided on the end surface of the SiO$_x$ waveguide layer 27 and, therefore, it is possible to use the optical waveguide coupler not only for a semiconductor laser of which the beam spot is in an elliptical form that is narrow in the vertical direction but also for a semiconductor laser of which the beam spot is small in the horizontal direction.

Fourth Embodiment

Figure 10:
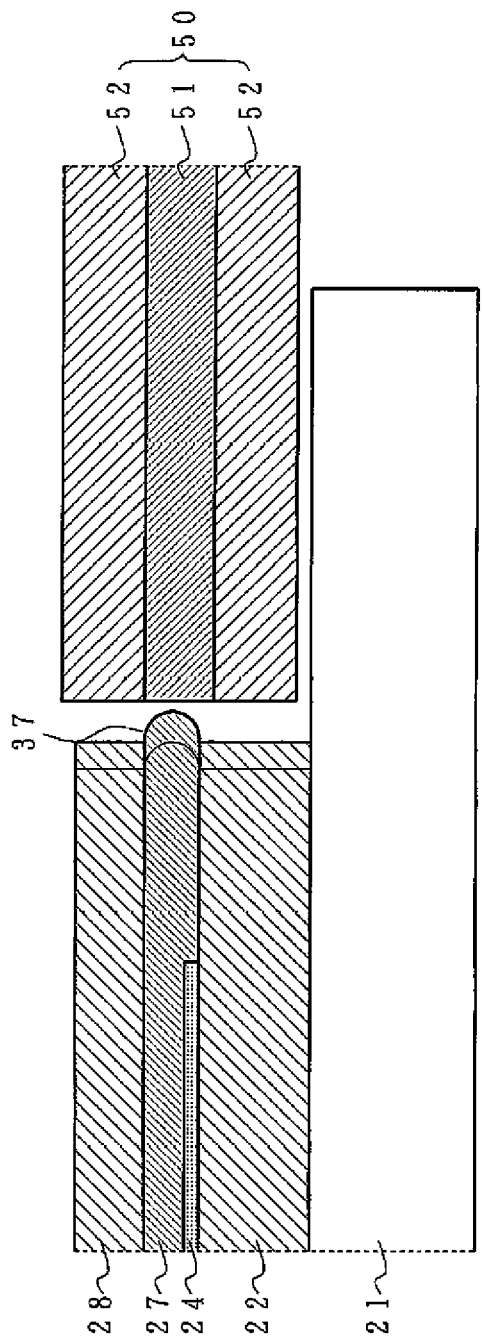
FIG. 10 is a diagram illustrating the optical interconnection system according to the fourth embodiment of the present invention.

Next, in reference to FIG. 10, the optical interconnection system according to the fourth embodiment of the present invention is described. Here, an optical interconnection system wherein the optical waveguide coupler according to the third embodiment and an optical fiber are coupled is described. FIG. 10 is a diagram illustrating the optical interconnection system according to the fourth embodiment of the present invention, wherein the lens portion 37 in a hemispherical form in the optical waveguide coupler according to the third embodiment and the core layer 51 of an optical fiber 50 are positionally matched in the layout. In the fourth embodiment the SiO₂ waveguide layer 27 has a thickness of 10 μm so as to match the size of the core layer of the optical fiber 50. In the figure, 52 is a clad layer.

In the fourth embodiment of the present invention, the optical signal inputted from the optical fiber 50 propagates through the SiO$_x$ waveguide layer 27 via the lens portion 37 in hemispherical form and is transmitted to an optical receiver via another optical fiber from the Si waveguide layer 24. Meanwhile, the optical signal that has propagated to the SiO₂ waveguide layer 27 from the Si waveguide 24 is more efficiently led to the core layer 51 of the optical fiber 50 by means of the lens portion 37 in hemispherical form.

As described above, a lens portion is provided on the end surface of the waveguide layer in the fourth embodiment of the present invention and, therefore, an optical signal can be efficiently inputted to, and outputted from, an optical fiber. Though in the fourth embodiment the lens is in a hemispherical form, a semi-cylindrical lens may be used in the same manner as in the first embodiment. In this case as well, an optical signal can be efficiently inputted to, and outputted from, an optical fiber.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An optical waveguide coupler, comprising: a substrate; and an optical waveguide of a multi-layer structure of a first clad layer/a first core layer/a second clad layer, at least, on an end surface side of an optical input and output provided on the substrate, characterized in that the first core layer has such a distribution of the refractive index that the refractive index is the highest at the middle of the first core layer in a stacking direction of the multi-layer structure, the refractive index of the first core layer in a portion contacting with the first clad layer and the second clad layer is lower than the refractive index of the middle of the first core layer, and the first core layer has such a protrusion in a convex form that the center portion having the highest refractive index protrudes in a cross section that is perpendicular to the end surface of the optical input and output and perpendicular to the main surface of the substrate.

2. The optical waveguide coupler according to claim 1, characterized in that the protrusion in the convex form is in convex form also in a cross section parallel to the substrate.

3. The optical waveguide coupler according to claim 1, characterized in that the first clad layer and the second clad layer are made of SiO₂ and the first core layer is made of SiOx wherein the composition ratio x is the lowest at the middle of the first core layer in the stacking direction of the multi-layer structure.

4. The optical waveguide coupler according to claim 1, characterized in that a second core layer having a higher refractive index than the first core layer is provided between the first clad layer and the first core layer in a position away from the end surface through which light enters and exits.

5. The optical waveguide coupler according to claim 4, characterized in that the second core layer has a tapered region such that the width of the core is narrower on the end surface side of the optical input and output and is wider as the position is further away from the end surface side of the optical input and output.

6. The optical waveguide coupler according to claim 4, characterized in that the substrate is a monocrystalline Si substrate in an SOI substrate wherein a monocrystalline Si layer is provided on the monocrystalline Si substrate with a buried insulating film in between, the first clad layer is the buried insulating film in the SOI substrate, and the second core layer is a core layer formed by processing the monocrystalline Si layer in the SOI substrate.

7. The optical waveguide coupler according to claim 6, characterized in that the SOI substrate has pedestals that are formed by processing a part of the monocrystalline Si substrate in the vicinity of the end surface of the optical input and output, and an optically functional element is mounted on the pedestals to make the protrusion of the first core layer and the surface of the optically functional element of the optical input and output to correspond to each other.

8. The optical waveguide coupler according to claim 7, characterized in that the optically functional element is any of a semiconductor laser, a semiconductor optical amplifier, a semiconductor light receiver and a semiconductor modulator.

9. A manufacturing method for an optical waveguide coupler, characterized by comprising:
forming a second core layer on a substrate with a first clad layer in between;
forming a first core layer having such a distribution of the refractive index that the refractive index is the highest at the middle in the stacking direction so as to cover the second core layer and the first clad layer that is exposed from the second core layer;
forming a second clad layer on the first core layer;
forming an end surface from which the layers from the second clad layer to
the first clad layer are exposed by etching at least the layers from the second clad layer to the first clad layer; and
forming a protrusion in a convex form of the first core layer so that the first core layer protrudes from the first clad layer and the second clad layer through etching under such conditions that the etching rates of the first clad layer and the second clad layer are faster than the etching rate of the first core layer.

10. The manufacturing method for an optical waveguide coupler according to claim 9, characterized in that the process of forming an end surface from which the layers from the second clad layer to the first clad layer are exposed is the process of forming an end surface in flush from which the layers from the second clad layer to the first clad layer are exposed, and the protrusion is in a semi-cylindrical form.

11. The manufacturing method for an optical waveguide coupler according to claim 9, characterized in that the process of forming an end surface from which the layers from the second clad layer to the first clad layer are exposed is the process of forming an end surface of a semi-cylindrical portion of which the center axis is in the stacking direction, wherein the end surface is made of portions of the surfaces from which the layers from the second clad layer to the first clad layer are exposed, and the protrusion is in a hemispherical form.

12. The manufacturing method for an optical waveguide coupler according to claim 9, characterized in that the substrate is a monocrystalline Si substrate in an SOI substrate wherein a monocrystalline Si layer is provided on the monocrystalline Si substrate with a buried insulating film in between, the first clad layer is the buried insulating film in the SOI substrate, and step of forming the second core layer is the process of forming a core layer that includes such a tapered region that the width of the core layer is narrower on the end surface side and is wider as the position is further away from the end surface by processing the monocrystalline Si layer in the SOI substrate.

* * * * *